US009400020B2

(12) United States Patent
Morimoto

(10) Patent No.: US 9,400,020 B2
(45) Date of Patent: Jul. 26, 2016

(54) WORK VEHICLE AND INCHING CONTROL DEVICE THEREOF

(71) Applicant: KOMATSU LTD., Tokyo (JP)

(72) Inventor: Tetsuya Morimoto, Nomi (JP)

(73) Assignee: KOMATSU LTD., Tokyo (JP)

( * ) Notice: Subject to any disclaimer, the term of this patent is extended or adjusted under 35 U.S.C. 154(b) by 155 days.

(21) Appl. No.: 14/366,424

(22) PCT Filed: Dec. 21, 2012

(86) PCT No.: PCT/JP2012/083216
§ 371 (c)(1),
(2) Date: Jun. 18, 2014

(87) PCT Pub. No.: WO2013/145477
PCT Pub. Date: Oct. 3, 2013

(65) Prior Publication Data
US 2015/0019092 A1 Jan. 15, 2015

(30) Foreign Application Priority Data

Mar. 29, 2012 (JP) ................................. 2012-075772

(51) Int. Cl.
F16D 25/12 (2006.01)
F16D 48/02 (2006.01)
F16D 43/25 (2006.01)
B60W 30/186 (2012.01)
F16D 48/06 (2006.01)
B60W 10/02 (2006.01)
B60W 10/11 (2012.01)

(52) U.S. Cl.
CPC ............. F16D 25/123 (2013.01); B60W 10/02 (2013.01); B60W 10/11 (2013.01); B60W 30/186 (2013.01);

(Continued)

(58) Field of Classification Search
CPC ...... F16D 25/123; F16D 48/02; F16D 48/062; F16D 48/066; F16D 48/068; F16D 2500/7043; F16D 2300/021; F16D 2300/0214; B60W 10/023; B60W 10/026; B60W 30/186; B60W 10/02
See application file for complete search history.

(56) References Cited

U.S. PATENT DOCUMENTS 4,502,579 A * 3/1985 Makita .................... F16D 37/02
192/82 T
5,954,618 A * 9/1999 Mikami ................ F16H 61/143
477/174

(Continued)

FOREIGN PATENT DOCUMENTS

JP 6-344782 A 12/1994
JP 7-91467 A 4/1995

(Continued)

OTHER PUBLICATIONS

The International Search Report for the corresponding international application No. PCT/JP2012/083216, issued on Feb. 19, 2013.

Primary Examiner — Jacob S Scott
Assistant Examiner — Tinh Dang
(74) Attorney, Agent, or Firm — Global IP Counselors, LLP

(57) ABSTRACT

An inching control device reliably protects the clutch during inching operation while not interfering with workability during inching operation. The device includes an allowable heat generation rate acquiring means for acquiring the allowable heat generation rate for the clutch plate, an operation amount detecting means for detecting the amount of the operation of the inching operation member, a heat generation rate calculating means for calculating the heat generation rate of the clutch plate during inching from the amount of the operation of the inching operation member, and an oil pressure controlling means for controlling the clutch oil pressure so that the heat generation rate obtained by the heat generation rate calculating means during inching does not exceed the allowable heat generation rate.

12 Claims, 6 Drawing Sheets

(52) U.S. Cl.
CPC .............. *F16D 48/02* (2013.01); *F16D 48/06*
(2013.01); *F16D 2500/111* (2013.01); *F16D 2500/3024* (2013.01); *F16D 2500/30402* (2013.01); *F16D 2500/30404* (2013.01); *F16D 2500/30405* (2013.01)

(56) References Cited

U.S. PATENT DOCUMENTS

| | | | | |
|---|---|---|---|---|
| 6,341,679 | B1* | 1/2002 | Abe | F16H 61/143 192/3.29 |
| 6,943,676 | B2* | 9/2005 | Mack | F16D 48/06 340/453 |
| 7,731,618 | B2* | 6/2010 | Burlington | A47L 5/22 15/308 |
| 8,869,921 | B2* | 10/2014 | Yoshikawa | B62D 11/08 180/6.7 |
| 8,960,811 | B2* | 2/2015 | Morishita | B60T 1/10 303/10 |
| 2008/0215220 | A1* | 9/2008 | Winkel | B60W 10/02 701/68 |
| 2009/0182475 | A1* | 7/2009 | Kishii | B60W 30/18063 701/67 |
| 2015/0217805 | A1* | 8/2015 | Yoshikawa | B62D 11/08 180/9.42 |

FOREIGN PATENT DOCUMENTS

| | | |
|---|---|---|
| JP | 2001-65685 A | 3/2001 |
| JP | 2003-166634 A | 6/2003 |
| JP | 2009-186003 A | 8/2009 |
| JP | 2010-149712 A | 7/2010 |

* cited by examiner

WORK VEHICLE AND INCHING CONTROL DEVICE THEREOF

CROSS-REFERENCE TO RELATED APPLICATIONS

This application is a U.S. National stage application of International Application No. PCT/JP2012/083216, filed on Dec. 21, 2012. This U.S. National stage application claims priority under 35 U.S.C. §119(a) to Japanese Patent Application No. 2012-075772, filed in Japan on Mar. 29, 2012, the entire contents of which are hereby incorporated herein by reference.

BACKGROUND

1. Field of the Invention

The present invention relates to an inching control device and in particular to an inching control device provided in a work vehicle equipped with an inching function, the device used for controlling clutch oil pressure supplied to a hydraulic clutch during an inching operation. The present invention further relates to a work vehicle equipped with the above inching control device.

2. Background Information

A work vehicle is equipped with an inching function that causes slipping in a hydraulic clutch provided in a transmission to reduce the vehicle speed. By using the inching function, the vehicle speed can be reduced while maintaining the engine rotation speed at a predetermined rotation speed. For example, a motor grader may travel while performing grading work with a blade. In this case, the operator is able to adjust the vehicle speed while suppressing a reduction in the driving power of the blade by activating an inching pedal to produce slipping in the clutch.

When the inching operation time increases in a work vehicle equipped with the inching function, the heat value of the clutch increases and wear of the clutch increases. The clutch may become damaged if the inching operation is continued while being overloaded.

Techniques for protecting the clutch during the inching operation have been proposed as disclosed in Japanese Laid-open Patent Publication No. 2009-186003, Japanese Laid-Open Patent Publication No. H06-344782, and Japanese Laid-open Patent Publication No. 2003-166634.

A load on the clutch is calculated during inching and a control is performed so that the engine rotation speed is lowered when the load on the clutch exceeds a threshold value in the work vehicle described in Japanese Laid-open Patent Publication No. 2009-186003. The heat value of the clutch is detected during inching and an alarm is issued when the heat value exceeds a reference value in a device described in Japanese Laid-Open Patent Publication No. H06-344782. The temperature of a clutch plate is detected during inching and the clutch is fastened or released when the detection temperature exceeds a threshold value in the device described in Japanese Laid-open Patent Publication No. 2003-166634.

SUMMARY

The engine rotation speed is decreased when the load on the clutch during inching exceeds a threshold value in the work vehicle described in Japanese Laid-open Patent Publication No. 2009-186003. However, when the engine rotation speed is lowered, the discharge amount from the oil pump for supplying lubricating oil is decreased which leads to a reduction in the amount of lubricating oil for the clutch. Therefore, the clutch cannot be sufficiently protected.

Because only an alarm is issued when the heat rate of the clutch exceeds the reference value in the device depicted in Japanese Laid-Open Patent Publication No. H06-344782, the clutch cannot be protected in a reliable manner.

Moreover, the clutch is fastened or released to protect the clutch in the device described in Japanese Laid-open Patent Publication No. 2003-166634, and therefore the inching may be forcefully stopped and workability may be impaired. For example, when the clutch is fastened or released to protect the clutch during inching, the vehicle speed increases suddenly or the vehicle is stopped. In particular, the vehicle may stop suddenly when the work load or the travel load is large.

The invention addresses the problem of configuring an inching control device that is capable of reliably protecting the clutch during an inching operation while not impairing workability during inching operation.

An inching control device in a work vehicle according to a first aspect of the present invention is provided in a work vehicle having a hydraulic clutch for transmitting driving power and having a clutch plate to which a friction material is fixed, and an inching operation member for causing slipping in the hydraulic clutch, the device controlling a clutch oil pressure supplied to the hydraulic clutch when the inching operation member is operated. The inching control device is provided with an allowable heat generation rate acquiring means for acquiring an allowable heat generation rate for the clutch plate, an operation amount detecting means for detecting an operation amount of the inching operation member, a heat generation rate calculating means for calculating a heat generation rate of the clutch plate during inching from the amount of the operation of the inching operation member, and an oil pressure controlling means for controlling the clutch oil pressure so that the heat generation rate obtained by the heat generation rate calculating means does not exceed the allowable heat generation rate during inching.

The device derives the heat generation rate of the clutch plate from the operation amount of the inching operation member during the inching operation. The clutch oil pressure of the hydraulic clutch performing the inching is controlled so that the heat generation rate of the clutch plate does not exceed the allowable heat generation rate.

The hydraulic clutch performing the inching can be protected in a reliable manner because the heat generation rate of the clutch plate is maintained within the allowable heat generation rate.

In particular, the heat generation rate, which is the rate of change of a heat generation amount, is derived instead of the heat generation amount when controlling the clutch oil pressure. The temperature of the clutch plate differs when the clutch plate heats up over a short time and when the clutch plate heats up over a longer time even when the heat generation amount is the same. This is because the impact on the release of heat is stronger when the clutch plate heats up over a longer period of time.

Accordingly in the exemplary embodiments of the present invention, the state of heat generation of the clutch plate is understood from moment to moment through the use of the heat generation rate. As a result, the clutch plate and the hydraulic clutch that includes the clutch plate can be protected more appropriately. Moreover, workability is not impaired because the inching is not forcefully stopped. In particular, the use of the heat generation rate has a great effect for a hydraulic clutch during inching in which the heat generation state changes from moment to moment in response to the operation amount of the inching operation member.

An inching control device of a work vehicle according to a second aspect of the present invention is related to the device of the first aspect, and is further provided with a relative rotation speed-detecting means for detecting a relative rotation speed that is a difference between input and output rotation speeds of the hydraulic clutch, a clutch oil pressure-acquiring means for deriving a clutch oil pressure that corresponds to the operation amount of the inching operation member, and a storage means for storing a coefficient of friction of the friction material. The heat generation rate calculating means calculates the heat generation rate of the clutch plate based on the relative rotation speed, the clutch oil pressure, and the coefficient of friction.

The inching control device of the work vehicle according to a third aspect of the present invention is related to the device of the second aspect, and further comprises a clutch oil pressure upper limit calculating means for calculating a clutch oil pressure upper limit corresponding to the allowable heat generation rate. The oil pressure controlling means sets the clutch oil pressure to the clutch oil pressure upper limit when the heat generation rate obtained by the heat generation rate calculating means exceeds the allowable heat generation rate.

When the heat generation rate of the clutch plate exceeds the allowable heat generation rate during inching, heat generation of the clutch plate can be suppressed and the hydraulic clutch can be effectively protected because the clutch oil pressure is set to the clutch oil pressure upper limit corresponding to the allowable heat generation rate.

An inching control device of a work vehicle according to a fourth aspect of the present invention is related to the device of the third aspect, wherein the clutch hydraulic pressure upper limit calculating means calculates the clutch oil pressure upper limit from conditional values that include at least the allowable heat generation rate, the relative rotation speed, and the coefficient of friction.

An inching control device of a work vehicle according to a fifth aspect of the present invention is related to any of the first to fourth aspects, wherein the storage means stores an inherent allowable heat generation rate that is determined according to a specification of the clutch plate. The control device is further provided with a correction allowable heat generation rate heat calculating means and an allowable heat generation rate setting means. The correction allowable heat generation rate calculating means calculates a correction allowable heat generation rate in accordance with a temperature of the clutch plate during inching. The allowable heat generation rate setting means selects the smaller of the inherent allowable heat generation rate and the correction allowable heat generation rate as the allowable heat generation rate.

The allowable heat generation rate is determined in consideration of not only the allowable heat generation rate determined based on the specification of the clutch plate (inherent heat generation rate), but also in consideration of the allowable heat generation rate determined in accordance with the temperature of the clutch plate during inching (correction allowable heat generation rate). Therefore, the hydraulic clutch can be more reliably protected.

An inching control device of a work vehicle according to a sixth aspect of the present invention is related to the device of the fifth aspect, and further comprises an oil temperature sensor, a storage means, and a clutch plate temperature calculating means. The oil temperature sensor detects a temperature of the lubricating oil supplied to the hydraulic clutch. The storage means stores the heat transfer coefficient of the lubricating oil and specification values of the clutch plate. The clutch plate temperature calculating means calculates the temperature of the clutch plate during inching based on conditional values including the oil temperature, the heat transfer coefficient of the lubricating oil, and specification values of the clutch plate.

Because the temperature of the clutch plate is derived by calculating, a sensor to detect the temperature of the clutch plate is unnecessary.

An inching control device of a work vehicle according to a seventh aspect of the present invention is related to the device of the sixth aspect, wherein the clutch plate temperature calculating means derives the temperature of the clutch plate in a predetermined period during inching by calculating. The correction allowable heat generation rate calculating means calculates the correction allowable heat generation rate in accordance with a temperature of the clutch plate obtained during the predetermined period.

The temperature of the clutch plate during inching changes from moment to moment. The invention of the seventh aspect calculates the temperature of the clutch plate in a predetermined period to derive the correction allowable heat generation rate. Therefore, the hydraulic clutch can be protected in a more reliable manner.

A work vehicle according to an eighth aspect of the present invention is provided with an engine, a travel mechanism for causing the vehicle to travel, a transmission that includes a hydraulic clutch having a clutch plate to which a friction material is fixed and that transmits driving power to the travel mechanism, an inching operation member for causing slipping in the hydraulic clutch, and the inching control device of the first to seventh aspects.

The present invention as described above is able to protect a clutch during an inching operation and also improves workability without forcefully causing the inching to be stopped during inching.

DESCRIPTION OF EXEMPLARY EMBODIMENTS

Overall Configuration

Figure 1:
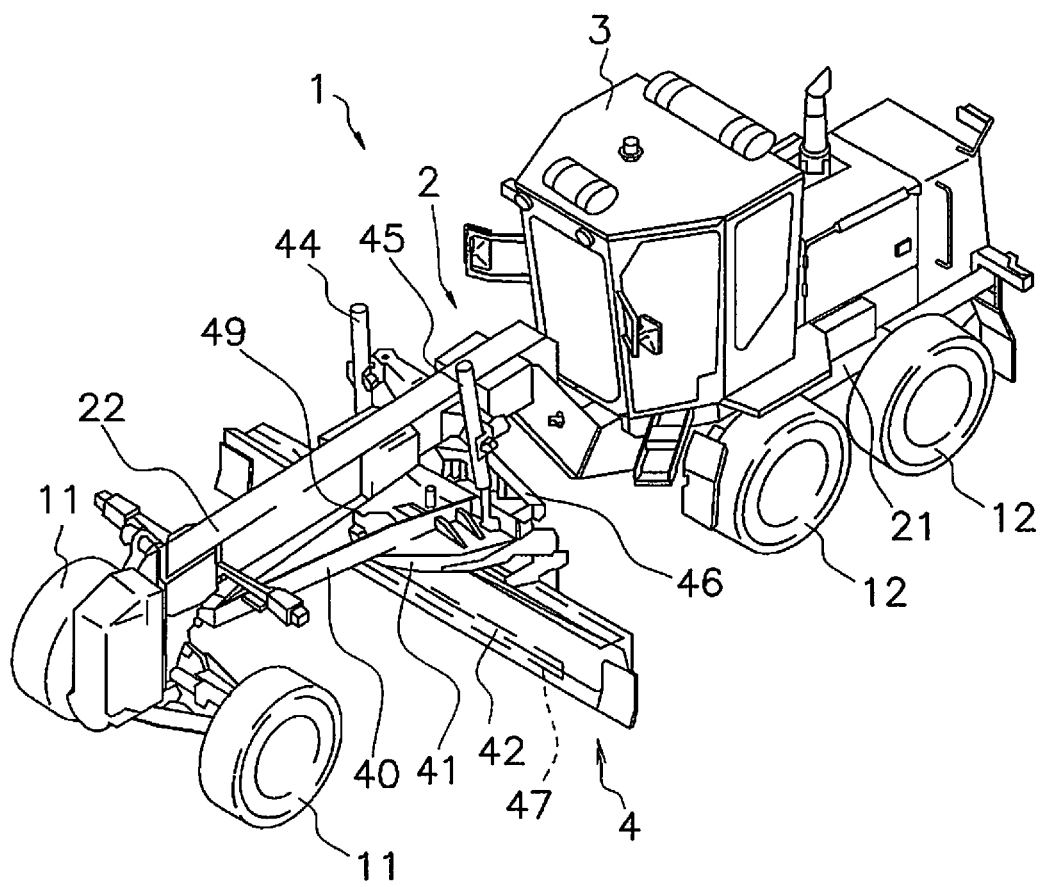
FIG. 1 is an external perspective view of a work vehicle.
Figure 2:
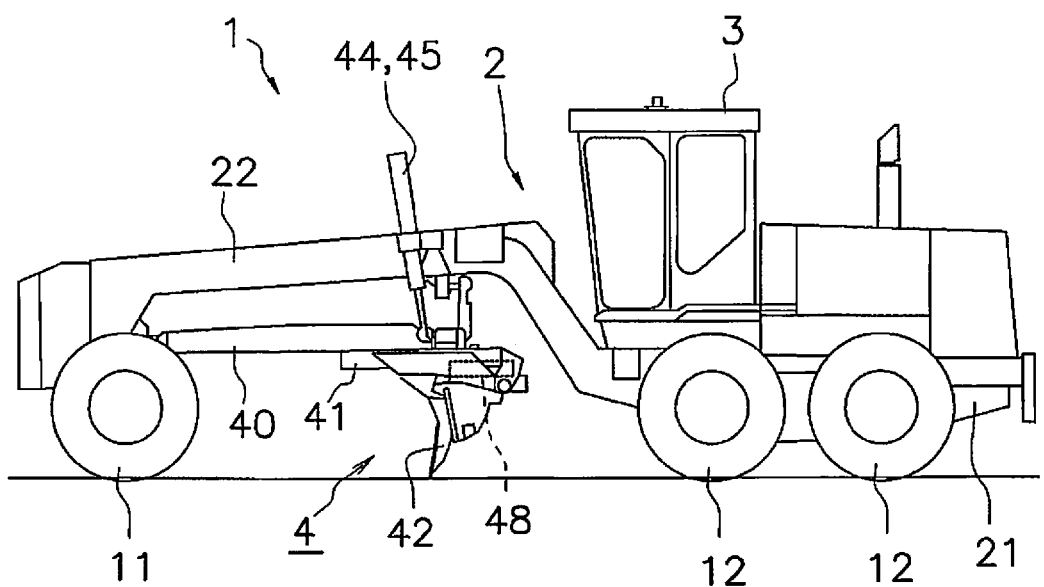
FIG. 2 is a side view of the work vehicle.

Herein, a motor grader will be described as an example of the work vehicle. FIGS. 1 and 2 are an external perspective view and a side view of a motor grader 1 provided with an inching control device according to an exemplary embodiment of the present invention.

The motor grader 1 is used for performing grading work, snow removal, light cutting, and material mixing and the like, and has a pair of right and left front wheels 11 and two rear wheels 12 on either side for a total of six traveling wheels, and a blade 42 provided between the front wheels 11 and the rear wheels 12. Only the left side of the four rear wheels 12 is illustrated in FIGS. 1 and 2.

The motor grader 1 is provided with a frame 2, an operating cabin 3, and a work implement 4 as illustrated in FIGS. 1 and 2. As illustrated in the block configuration diagram in FIG. 3, the motor grader 1 is provided with an engine 5, a power transmission mechanism 6, a travel mechanism 9, a hydraulic drive mechanism 7, operating unit 10, and a control unit 8.

Frame and Operating Cabin

The frame 2 is configured of a rear frame 21 and a forward frame 22.

The rear frame 21 contains the engine 5, the power transmission mechanism 6, and the hydraulic drive mechanism 7 and the like. The four aforementioned rear wheels 12 are provided on the rear frame 21 and the rear wheels 12 are driven by rotation by driving power from the engine 5.

The forward frame 22 is provided in front of the rear frame 21 and the front wheels 11 are provided on a front end part of the forward frame 11.

The operating cabin 3 is mounted on the rear frame 21, and an operating unit such as a steering handle, a speed change lever, an operating lever for the work implement 4, a brake, and accelerator pedal 14, and an inching pedal 13 (see FIG. 3) is provided in the operating cabin 3.

Work Implement

The work implement 4 has a drawbar 40, a circle 41, the blade 42, a hydraulic motor 49, a pair of lift cylinders 44 and 45, a drawbar shift cylinder 46, a blade shift cylinder 47, and a tilt cylinder 48.

A front end part of the drawbar 40 is provided in a manner that allows swinging at the front end part of the forward frame 22, and a rear end part of the drawbar 40 is moved up and down due to the synchronized extension and contraction of a pair of lift cylinders 44 and 45. As a result, the blade 42 can be moved in the vertical direction. Moreover, the drawbar 40 is tilted in the vertical direction due to the extension and contraction of the lift cylinders 44 and 45. The drawbar 40 swings up and down around an axis along the vehicle travel direction due to the extension and contraction of the drawbar shift cylinder 46. As a result, the angle of inclination of the blade 42 can be changed.

The circle 41 is attached in a rotatable manner to the rear end part of the drawbar 40. The circle 41 is driven by the hydraulic motor 49 and rotates in the clockwise direction or the anti-clockwise direction with respect to the drawbar 40 as seen from above the vehicle.

The blade 42 is supported in a manner that allows sliding in the horizontal direction (the left-right direction with respect to the travel direction of the vehicle) with respect to the circle 41 and in a manner that allows swinging up and down relative to an axis parallel to the horizontal direction. Specifically, the blade 42 can be moved in the horizontal direction relative to the circle 41 due to the blade shift cylinder 47 supported on the circle 41. The blade 42 can swing relative to the axis parallel to the horizontal direction with respect to the circle 41 to change the orientation of the blade 42 in the vertical direction due to the tilt cylinder 48 (see FIG. 2). As a result, the angle of inclination of the blade 42 can be changed with respect to the travel direction.

The hydraulic motor 49 is able to rotate the circle 41 by being driven by pressure oil supplied from a below mentioned first hydraulic pump 71. The hydraulic cylinders 44 to 48 are driven by pressure oil supplied from the first hydraulic pump 71.

As described above, the blade 42 is able to move up and down with respect to the vehicle, change the tilt thereof with respect to the travel direction, change the tilt thereof with respect to the horizontal direction, rotate, and shift in the left-right direction through the drawbar 40 and the circle 41.

Engine

Figure 3:
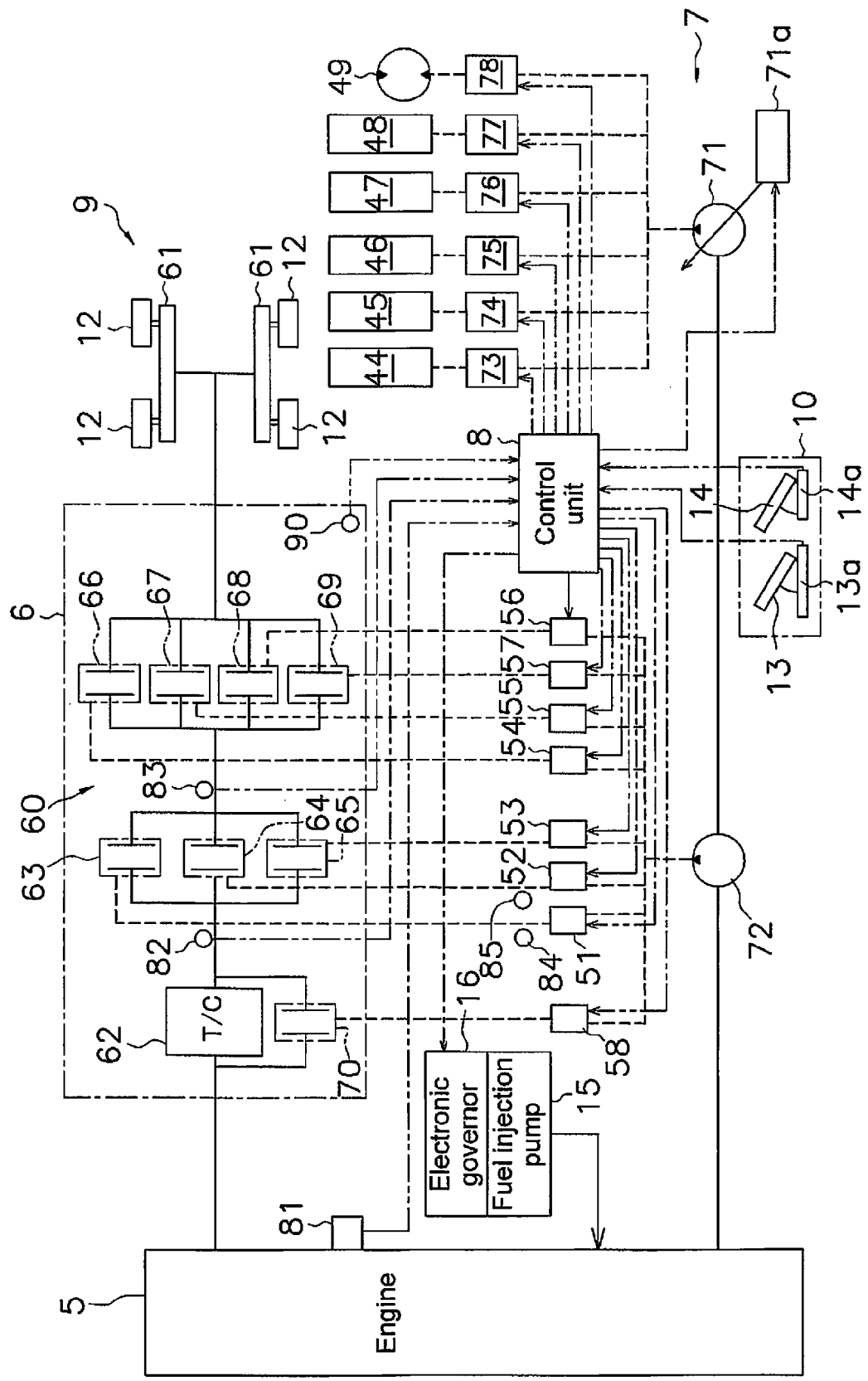
FIG. 3 is a block diagram illustrating a configuration of the work vehicle.

As illustrated in FIG. 3, a fuel injection pump 15 is provided on the engine 5 and fuel is supplied from the fuel injection pump 15 to the engine 5. The supply amount is controlled by command signals outputted by an electronic governor 16 from the below mentioned control unit 8. The rotation speed of the engine 5 is detected by an engine rotation speed sensor 81 and sent to the control unit 8 as a detection signal. The control unit 8 is able to control the rotation speed of the engine 5 by controlling the supply amount of fuel to the engine 5 by sending the command signals to the electronic governor 16.

Power Transmission Mechanism

The power transmission mechanism 6 is a mechanism for transmitting driving power from the engine 5 to the rear wheels 12, and has a torque converter 62 and a transmission 60.

The torque converter 62 is connected to the output side of the engine 5. A lock-up clutch 70 that directly couples an input side member and an output side member of the torque converter 62 is provided on the torque converter 62. The lock-up clutch 70 switches between an engaged condition and a released condition based on the vehicle speed. When the vehicle speed equals or exceeds a fixed value, a command signal is transmitted form the control unit 8 to a lock-up clutch control valve 58 and pressure oil is supplied to the lock-up clutch 70 whereby the lock-up clutch 70 enters the engaged condition.

The transmission 60 has a FL clutch 63, a FH clutch 64, a R clutch 65, a first clutch 66, a second clutch 67, a third clutch 68, a fourth clutch 69, and a plurality of change gears which are not illustrated. The clutches 63 to 69 are multi-plate hydraulic clutches that are driven by pressure oil supplied from a below mentioned second hydraulic pump 72. That is, the clutches 63 to 69 each have an input side clutch plate and an output side clutch plate, and both sides of either of the clutch plates are provided with a friction material. An oil temperature sensor 90 for detecting the oil temperature inside the transmission 60 is provided in the transmission 60.

Either one of the FL clutch 63 and the FH clutch 64 enters the engaged condition during forward travel, and the R clutch 65 enters the engaged condition during reverse travel. The first clutch 66, the second clutch 67, the third clutch 68, and the fourth clutch 69 enter the engaged condition when driving power is transmitted to the corresponding change gear. Velocity stages of speeds 1 to 8 may be selected according to combinations of either of the FL clutch 63 and the FH clutch 64 and any of the first clutch 66 to the fourth clutch 69 during forward travel. Moreover, velocity stages of speeds 1 to 4 may be selected according to combinations of the R clutch 65 and any of the first clutch 66 to the fourth clutch 69 during reverse travel.

Input rotation speeds input to the FL clutch 63 and the FH clutch 64 are detected by an input rotation speed sensor 82, and the detection results are sent to the control unit 8. Output rotation speeds output from the FL clutch 63 and the FH clutch 64 are detected by an output rotation speed sensor 83, and the detection results are sent to the control unit 8.

Travel Mechanism

The travel mechanism 9 is a mechanism for enabling the vehicle to travel by using driving power from the engine 5. The travel mechanism 9 receives driving power from the engine 5 through the power transmission mechanism 6. The travel mechanism 9 has a final speed reduction gear, which is not illustrated, a tandem device 61, and the rear wheels 12. Driving power outputted by the transmission 60 is transmitted to the rear wheels 12 through the final speed reduction gear and the tandem device 61, whereby the rear wheels 12 are rotated.

Hydraulic Drive Mechanism

The hydraulic drive mechanism 7 is a mechanism for generating oil pressure from driving power from the engine 5 and for driving the clutches 63 to 69, the hydraulic motor 49, and the cylinders 44 to 48 with oil pressure. The hydraulic drive mechanism 7 has the first hydraulic pump 71, the second hydraulic pump 72, first to fifth cylinder control valves 73 to 77, the hydraulic motor control valve 78, and the first to fifth clutch control valves 51 to 57.

The first hydraulic pump 71 is driven by driving power from the engine 5 and supplies pressure oil to the cylinders 44 to 48 and to the hydraulic motor 49. The first hydraulic pump 71 is a variable capacity hydraulic pump that is able to change the capacity of the pressure oil to be discharged due to a pump capacity control cylinder 71a changing the tilt angle of a tilt plate.

The second hydraulic pump 72 is driven by driving power from the engine 5 and supplies pressure oil to the clutches 63 to 69 and to the lock-up clutch 70.

The hydraulic pressure control valves 73 to 78 and 51 to 57 are electromagnetic proportional control valves that are able to adjust the oil pressure by being electrically controlled by the control unit 8.

The first to fifth cylinder control valves 73 to 77 adjust the oil pressure supplied to the cylinders 44 to 48. The oil pressure supplied to the cylinders 44 to 48 is detected by a hydraulic pressure sensor (not illustrated) and the detection result thereof is sent to the control unit 8.

The hydraulic motor control valve 78 adjusts the oil pressure supplied to the above mentioned hydraulic motor 49.

The first to seventh clutch control valves 51 to 57 adjust the oil pressure supplied to the clutches 63 to 69. Specifically, the first clutch control valve 51 adjusts the oil pressure supplied to the FL clutch 63, and second clutch control valve 52 adjusts the oil pressure supplied to the FH clutch 64. The third clutch control valve 53 adjusts the oil pressure supplied to the R clutch 65. The fourth clutch control valve 54, the fifth clutch control valve 55, the sixth clutch control valve 56, and the seventh clutch control valve 57 respectively adjust the oil pressures supplied to the first clutch 66, the second clutch 67, the third clutch 68, and the fourth clutch 69.

The oil pressures supplied to the clutches 63 to 69 are detected by hydraulic pressure sensors and the detection results thereof are sent to the control unit 8. Only a hydraulic pressure sensor 84 for detecting the oil pressure supplied to the FL clutch 63 and a hydraulic pressure sensor 85 for detecting the oil pressure supplied to the FH clutch 64 are depicted in FIG. 3, and other hydraulic pressure sensors are omitted.

Operating Unit

The operating unit 10 is a unit operated by an operator for controlling the work implement 4 and the travel of the motor grader 1. The operating unit 10 includes operation members, such as the inching pedal 13 and the accelerator pedal 14. The inching pedal 13 is an operation member that is operated to cause slipping in the FL clutch 63 or the FH clutch 64 to reduce the vehicle speed. A pressing amount of the inching pedal 13 is detected by a sensor 13a and the detection result is sent to the control unit 8. The accelerator pedal 14 is a member for setting the engine rotation speed to a desired rotation speed. The pressing amount of the accelerator pedal 14 is detected by a sensor 14a and the detection result is sent to the control unit 8.

Control Unit

The control unit 8 controls the first to fifth cylinder control valves 73 to 77 and the hydraulic motor control valve 78 on the basis of detection signals from the operating unit 10 and detection signals from various sensors, and thus is able to operate the work implement 4. For example, the control unit 8 is able to move the blade 42 in the vertical direction by transmitting command signals to the first cylinder control valve 73 and to the second cylinder control valve 74 and control the oil pressure supplied to the lift cylinders 44 and 45.

The control unit 8 is also able to control speed changes suitable to the state of the vehicle by controlling the first to seventh clutch control valves 51 to 57 on the basis of operation signals from the operating unit 10 and signals from the various sensors.

The control unit 8 determines a supply amount of fuel to the engine 5 on the basis of operation signals from the accelerator pedal 14 and the engine rotation speed detected by the engine rotation speed sensor 81. The control unit 8 then transmits a command signal in accordance with the determined supply amount to the electronic governor 16. As a result, the fuel injection amount from the fuel injection pump is adjusted to an amount that conforms to the operation amount of the accelerator pedal 14 whereby the engine rotation speed is controlled. As a result, the operator is able to control the output of the work implement 4 and the speed of the vehicle.

Moreover, the control unit 8 adjusts the command signals to the first clutch control valve 51 or to the second clutch control valve 52 on the basis of signals from the sensor 13a when the inching pedal 13 is operated. As a result, the oil pressure supplied to the FL clutch 63 or the FH clutch 64 is reduced. That is, the pressing force of the clutch that is in the engaged condition among the FL clutch 63 and the FH clutch 64 is reduced and clutch slipping is caused. As a result, the driving power transmitted from the power transmission mechanism 6 to the travel mechanism 9 is decreased whereby the vehicle speed is decreased. Therefore, the operator is able to adjust the vehicle speed while suppressing a reduction in the engine rotation speed and maintaining output of the work implement 4 by operating the inching pedal 13.

Clutch Protection Control

Figure 4:
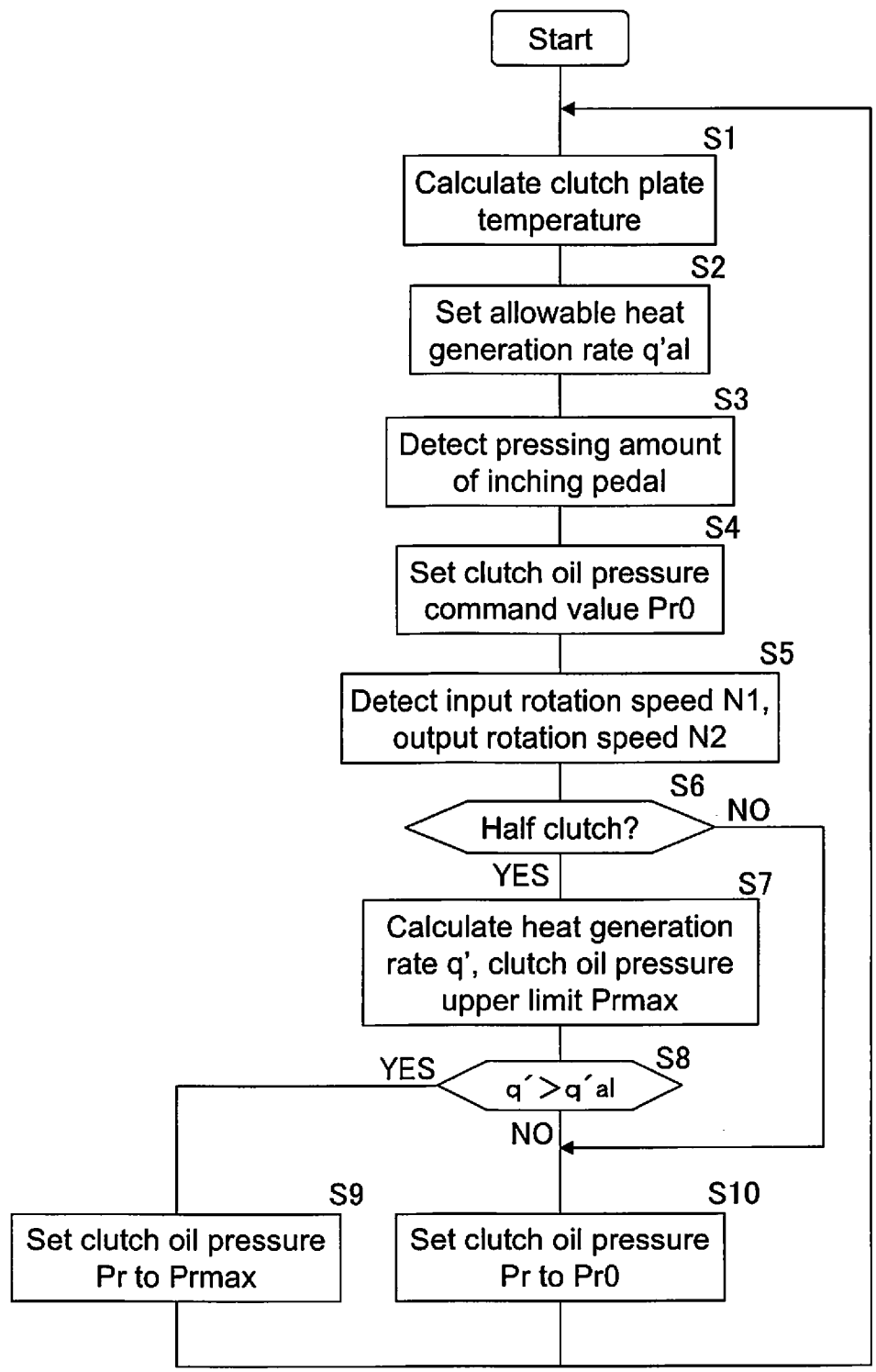
FIG. 4 is a flow chart of a clutch protection process.

To prevent overheating of the clutch during an inching operation, clutch protection control is performed in the motor grader 1. Hereinbelow, the clutch protection control executed during inching will be explained with reference to the flow chart illustrated in FIG. 4. The processing illustrated in FIG. 4 is repeatedly executed at predetermined periods.

The following specification values are previously stored in a memory of the control unit 8 for the clutch protection control.

Coefficient of friction of the friction material on the clutch plate: $\mu$

Piston surface area of hydraulic clutch: APr ($cm^2$)

Return spring force of piston: Fs (N)

Actual surface area per one surface of clutch plate friction surface: Ad ($cm^2$)

Average circumference of clutch plate friction surface: Cm (m)

Clutch plate temperature allowable value (experience value): Tal (° C.)

Clutch plate heat transfer coefficient (experimental value): $\beta$

Effective surface area ratio of clutch plate: a

Heat generation rate first allowable value q'all (inherent allowable heat generation rate) determined according to specification of clutch plate.

c: Specific heat of clutch plate (cal/g/° C.)

$\gamma$: Specific gravity of clutch plate (g/$cm^3$)

V0: Thickness of clutch plate (cm)

First, in step S1, the temperature of the clutch plate is calculated. A clutch plate temperature T is calculated with the following formula (1)

$$T=TL+A\times q'\times(1-e^{-Bt})+(T'-TL)\times e^{-Bt} \quad (1)$$

A=$f_1$(a, β, Ne)
B=$f_2$(β, Ne, c, γ, V0)
T': Previous clutch plate temperature (° C.)
TL: Transmission oil temperature (° C.)
q': Heat generation rate (MPa·m/sec)
β: Clutch plate heat transfer coefficient (experimental value)
Ne: Engine rotation speed (rpm)
t: Sampling time (sec)

Moreover, the heat generation rate q' is calculated with the following formula (2)

$$q'=\mu\times P\times V \quad (2)$$

μ: Friction material coefficient of friction
P: Clutch surface pressure (MPa)=(Pr×Apr×100−Fs)/Ad/100
  Pr: Clutch command hydraulic pressure (MPa)
  Apr: Piston surface area of hydraulic clutch (cm$^2$)
  Fs: Return spring force of piston (N)
  Ad: Actual surface area per one surface of clutch plate friction surface (cm$^2$)
V: Relative circumferential speed of (m/s)=Cm×ΔN/60
  Cm: Average circumference of clutch plate friction surface (m)
  ΔN: Clutch plate relative rotation speed (rpm)

As described above, the values of the effective surface area ratio of the clutch plate (a), the specific heat of the clutch plate (c), the specific gravity of the clutch plate (γ), the thickness of the clutch plate (V0), the coefficient of friction of the friction material of the clutch plate (μ), the piston surface area of the hydraulic clutch (APr), the return spring force of the pistons (Fs), the actual surface area per 1 surface of the clutch plate friction surface (Ad), the average circumference of the clutch plate friction surface (Cm), the clutch plate heat transfer coefficient (experimental value β), are previously stored in the memory of the control unit 8.

The clutch command hydraulic pressure (Pr) is a value derived on the basis of the pressing amount of the inching pedal 13. The relationship between the pressing amount of the inching pedal 13 and the clutch command hydraulic pressure is previously mapped and stored in the memory of the control unit 8. Further, the clutch plate relative rotation speed (ΔN) is derived from the detection result of the input rotation speed sensor 82 and the output rotation speed sensor 83.

In step S1, the current clutch plate temperature is calculated from the clutch plate temperature of the previous period and the clutch command hydraulic pressure. In step S1 for the first period, the transmission oil temperature obtained from the oil temperature sensor is used as the clutch plate temperature.

Next in step S2, the allowable heat generation rate q'al is derived. Since the allowable heat generation rate q'al changes according to the temperature of the clutch plate, the allowable heat generation rate q'al is derived according to the flowchart illustrated in FIG. 5 which will be described below.

After the allowable heat generation rate q'al is derived in step S2, the routine moves to step S3. In step S3, the pressing amount of the inching pedal 13 is detected. In step S4, the clutch oil pressure hydraulic command value Pr0 is derived from the pressing amount of the inching pedal 13. The clutch oil pressure in this case is the oil pressure supplied to the hydraulic clutch that is performing slipping control due to an inching operation.

An input rotation speed N1 and an output rotation speed N2 of the hydraulic clutch performing the inching control are detected in step S5. That is, the clutch plate relative rotation speed (ΔN) is derived in order to derive the current clutch plate heat generation rate q' using formula (2).

A determination is made in step S6 as to whether the hydraulic clutch performing the inching is in a half clutch state. This determination may be made according to whether the inching pedal 13 is being pressed, or according to the clutch oil pressure hydraulic command value set in step S4. Moreover, the determination may be made with the clutch plate relative rotation speed. When determining the clutch oil pressure hydraulic command value, the determination is made as to whether the clutch oil pressure hydraulic command value is equal to or less than a predetermined value.

When it is determined that the half clutch state is present in step S6, the routine moves from step S6 to step S7.

The formula (2) is used to calculate the current clutch plate heat generation rate q' next in step S7. Moreover, the clutch oil pressure upper limit Prmax of the hydraulic clutch performing the inching control is acquired from the allowable heat generation rate q'al in step S7. Because the clutch oil pressure upper limit Prmax is determined according to the allowable heat generation rate q'al, the explanation thereof will be explained below with the explanation related to the setting of the allowable heat generation rate q'al.

Next in step S8, a determination is made as to whether the current heat generation rate q' obtained in step S7 exceeds the allowable heat generation rate q'al obtained in step S2.

When the current heat generation rate q' exceeds the allowable heat generation rate q'al, the routine moves from step S8 to step S9. In step S9, the clutch oil pressure of the hydraulic clutch performing the inching is set to the clutch oil pressure upper limit Prmax derived in step S7. As a result, the clutch oil pressure of the hydraulic clutch is set to an oil pressure lower than the clutch oil pressure Pr0 in accordance with the pressing amount of the inching pedal 13.

When the current heat generation rate q' does not exceed the allowable heat generation rate q'al, the routine moves from step S8 to step S10. In step S10, the clutch oil pressure of the hydraulic clutch performing the inching is set to the clutch oil pressure Pr0 in accordance with the pressing amount of the inching pedal 13.

Setting Allowable Heat Generation Rate q'al

Figure 5:
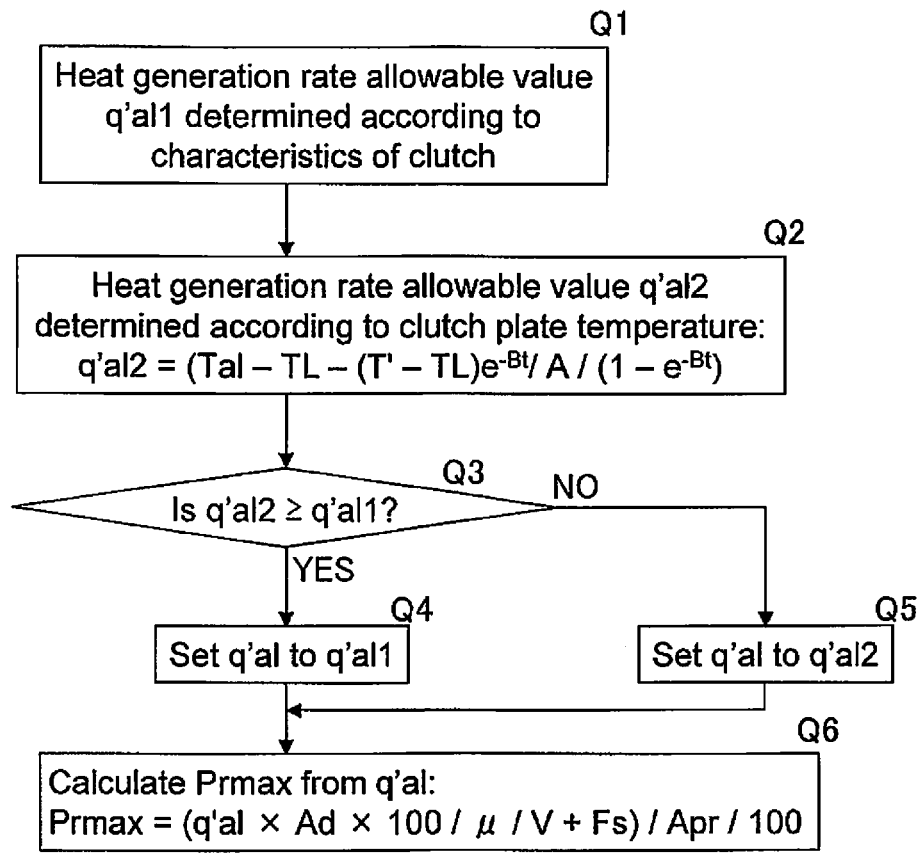
FIG. 5 is a flow chart for setting an allowable heat generation rate.

Processing to set the allowable heat generation rate q'al is explained with reference to the flow chart in FIG. 5.

A heat generation rate first allowable value q'al1 (inherent allowable heat generation rate) determined according to a specification of the clutch plate stored in the memory in the control unit, is acquired in step Q1. Next, in step Q2, a heat generation rate second allowable value q'al2 (correction allowable heat generation rate) determined according to the temperature of the clutch plate, is derived according to the following formula (3).

$$q'al2=(Tal-TL-(T'-TL)e^{-Bt}/A/(1-e^{-Bt}) \quad (3)$$

Tal: allowable temperature value of clutch plate (C)

The allowable temperature value of the clutch plate (Tal) is a value previously determined according to the clutch plate specification and an experience value, and is stored in the memory of the control unit 8 as described above.

Next in step Q3, a determination is made as to whether the heat generation rate second allowable value q'al2 is equal to or greater than the heat generation rate first allowable value q'al1. When the heat generation rate second allowable value q'al2 is equal to or greater than the heat generation rate first allowable value q'al1, the routine moves to step Q4 and the heat generation rate first allowable value q'al1 is used as the allowable heat generation rate q'al. When the heat generation rate second allowable value q'al2 is less than the heat generation rate first allowable value q'al1, the heat generation rate second allowable value q'al2 is used as the allowable heat generation rate q'al.

That is, in comparing the heat generation rate first allowable value q'al1 that is determined according to the clutch plate specification with the heat generation rate second allowable value q'al2 that is determined according to the temperature of the clutch plate during inching, the smaller of the values is used as the allowable heat generation rate q'al.

Next in step Q6, the clutch oil pressure upper limit Prmax of the hydraulic clutch performing the inching control is derived from the allowable heat generation rate q'al with the following formula (4).

$$Pr\max = (q'al \times Ad \times 100/\mu/V + Fs)/Apr/100 \qquad (4)$$

Ad: Actual surface area per one surface of clutch plate friction surface (cm$^2$)

µ: Friction material coefficient of friction

V: Relative circumferential speed of clutch plate (m/s)= Cm×ΔN/60

Fs: Return spring force of pistons (N)

Apr: Piston surface area of hydraulic clutch (cm$^2$)

These values are stored in the memory in the control unit 8 or are derived from stored values as described above.

Figure 6:
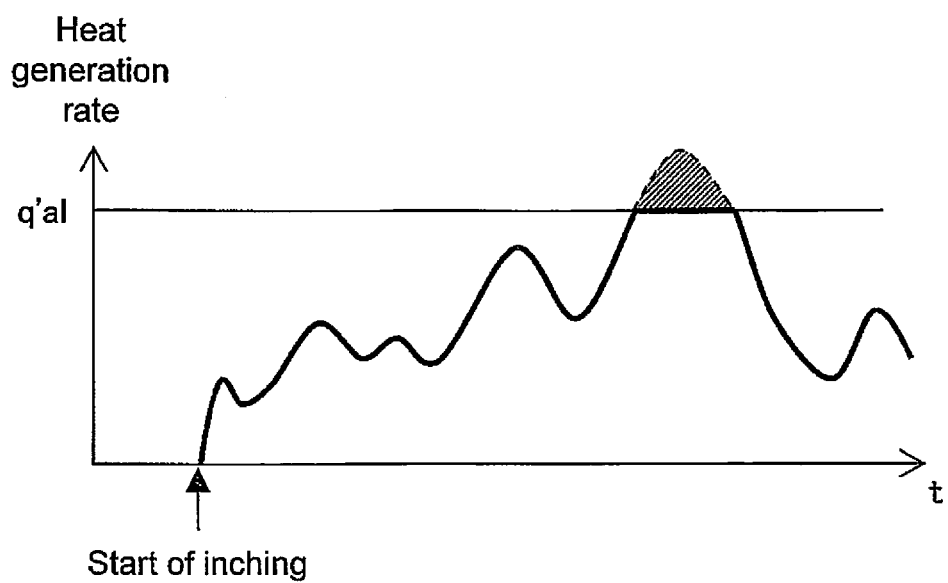
FIG. 6 illustrates a limit of the heat generation rate due to clutch protection control.

By executing the above control, the inching operation is limited so that the heat generation rate that exceeds the allowable heat generation rate q'al (portion illustrated by shaded region in FIG. 6) falls as illustrated in FIG. 6.

Characteristics

When the heat generation rate of the clutch plate exceeds the allowable heat generation rate during inching, the clutch oil pressure is set to the clutch oil pressure upper limit corresponding to the allowable heat generation rate. Therefore, heat generation of the clutch plate is suppressed and the clutch plate can be reliably protected.

Because the heat generation rate is derived and the clutch oil pressure is controlled without using the amount of heat generation of the clutch plate, a more precise temperature can be calculated for the hydraulic clutch during inching in which the heat generation state changes from moment to moment in comparison to when the control is performed using the heat generation amount. As a result, the clutch plate can be protected in a more appropriate manner.

Because the inching is not forcefully stopped during the inching operation, the vehicle speed does not suddenly increase nor does the vehicle stop. Therefore, workability is not impaired.

The clutch plate can be protected more reliably because a comparison is made between the heat generation rate first allowable value determined according to the clutch plate specification and the heat generation rate second allowable value calculated from the temperature of the clutch plate during inching, and the lower of the two values is established as the allowable heat generation rate.

Because the temperature of the clutch plate is derived by calculation, a sensor to detect the temperature of the clutch plate is unnecessary.

Because the allowable heat generation rate is corrected in accordance with the temperature of the clutch plate that changes moment to moment during the inching operation, the clutch plate can be protected more reliably.

OTHER EXEMPLARY EMBODIMENTS

The present invention is not limited to the above exemplary embodiments and various changes and modifications may be made without departing from the spirit of the invention.

The setting of the allowable heat generation rate q'al is not limited to the exemplary embodiment. That is, the allowable heat generation rate q'al may use the heat generation rate first allowable value q'al1 that is determined according to the clutch plate specification, or may use the heat generation rate second allowable value q'al2 that is derived from the temperature of the clutch plate during the inching operation.

While the temperature of the clutch plate is derived from a calculation using formula (1) in the exemplary embodiment, the temperature may be derived by using a sensor.

While the allowable heat generation rate is derived from the temperature of the clutch plate using formula (3), a corresponding map of both may be prepared in advance and stored in a memory.

While a motor grader has been used as an example in the explanation of the work vehicle, the present invention may be applied in the same way to another work vehicle.

The inching control device of the exemplary embodiments of the present invention is able to protect a clutch during an inching operation and also improves workability without forcefully causing the inching to be stopped during inching.

What is claimed is:

1. An inching control device configured to be provided in a work vehicle having a hydraulic clutch for transmitting driving power, the hydraulic clutch having a clutch plate to which a friction material is fixed and an inching operation member for causing slipping in the hydraulic clutch, the inching control device controlling a clutch oil pressure supplied to the hydraulic clutch when the inching operation member is operated, the inching control device comprising:
    an operation amount sensor arranged to detect an operation amount of the inching operation member;
    a clutch oil pressure control valve arranged to adjust the clutch oil pressure;
    a clutch oil pressure sensor arranged to detect the clutch oil pressure;
    an inching control unit programmed to
        acquire an allowable heat generation rate of the clutch plate;
        acquire the operation amount of the inching operation member detected by the operation amount sensor;
        calculate a heat generation rate of the clutch plate during inching based on the operation amount of the inching operation member; and
        control the clutch oil pressure control valve so that the calculated heat generation rate does not exceed the allowable heat generation rate during inching.

2. The inching control device in the work vehicle according to claim 1, wherein
    the inching control unit includes a memory, the inching control unit being further programmed to
        detect a relative rotation speed that is a difference between input and output rotation speeds of the hydraulic clutch;
        derive a clutch oil pressure corresponding to the operation amount of the inching operation member;
        acquire a coefficient of friction of the friction material that is stored in the memory;
        calculate the heat generation rate of the clutch plate based on the relative rotation speed, the clutch oil pressure, and the coefficient of friction.

3. The inching control device in the work vehicle according to claim 2, wherein
the inching control unit is further programmed to
calculate a clutch oil pressure upper limit corresponding to the allowable heat generation rate; and
set the clutch oil pressure to the clutch oil pressure upper limit when the calculated heat generation rate exceeds the allowable heat generation rate.

4. The inching control device in the work vehicle according to claim 3, wherein
the inching control unit calculates the clutch oil pressure upper limit from conditional values that include at least the allowable heat generation rate, the relative rotation speed, and the coefficient of friction.

5. The inching control device in the work vehicle according to claim 4, wherein
the memory stores an inherent allowable heat generation rate that is determined according to a specification of the clutch plate; and
the inching control unit is further programmed to
calculate a correction allowable heat generation rate in accordance with the temperature of the clutch plate during inching, and
select the smaller of the inherent allowable heat generation rate and the correction allowable heat generation rate as the allowable heat generation rate.

6. The inching control device in the work vehicle according to claim 5, further comprising
an oil temperature sensor for detecting a temperature of a lubricating oil supplied to the hydraulic clutch,
the memory storing a heat transfer coefficient of the lubricating oil and specification values of the clutch plate, and
the inching control unit being further programmed to calculate a temperature of the clutch plate during inching based on conditional values that include the oil temperature, the heat transfer coefficient of the lubricating oil, and the specification values of the clutch plate.

7. The inching control device in the work vehicle according to claim 6, wherein:
the inching control unit is further programmed to
calculating the temperature of the clutch plate in a predetermined period during inching; and
calculate the correction allowable heat generation rate in accordance with the temperature of the clutch plate obtained in the predetermined period.

8. The inching control device in the work vehicle according to claim 1, further comprising a memory that stores an inherent allowable heat generation rate that is determined according to a specification of the clutch plate,
the inching control unit being further programmed to
calculate a correction allowable heat generation rate in accordance with a temperature of the clutch plate during inching, and select the smaller of the inherent allowable heat generation rate and the correction allowable heat generation rate as the allowable heat generation rate.

9. The inching control device in the work vehicle according to claim 8, further comprising
an oil temperature sensor for detecting a temperature of a lubricating oil supplied to the hydraulic clutch,
the memory storing a heat transfer coefficient of the lubricating oil and specification values of the clutch plate, and
the inching control unit being further programmed to calculate a temperature of the clutch plate during inching based on conditional values that include the oil temperature, the heat transfer coefficient of the lubricating oil, and the specification values of the clutch plate.

10. The inching control device in the work vehicle according to claim 9, wherein
the inching control unit is further programmed to
derive the temperature of the clutch plate by calculating the temperature of the clutch plate in a predetermined period during inching; and
calculate the correction allowable heat generation rate in accordance with the temperature of the clutch plate obtained in the predetermined period.

11. A work vehicle, comprising:
an engine;
a travel mechanism for causing the vehicle to travel;
a transmission that includes a hydraulic clutch having a clutch plate to which is fixed a friction material and that transmits driving power from the engine to the travel mechanism;
an inching operation member for causing slipping in the hydraulic clutch; and
an inching control device, the inching control device controlling a clutch oil pressure supplied to the hydraulic clutch when the inching operation member is operated, the inching control device comprising;
an operation amount sensor arranged to detect an operation amount of the inching operation member;
a clutch oil pressure control valve arranged to adjust the clutch oil pressure:
a clutch oil pressure sensor arranged to detect the clutch oil pressure;
an inching control unit programmed to
acquire an allowable heat generation rate of the clutch plate;
acquire the operation amount of the inching operation member detected by the operation amount sensor;
calculate a heat generation rate of the clutch plate during inching based on the operation amount of the inching operation member; and
control the clutch oil pressure control valve so that the calculated heat generation rate does not exceed the allowable heat generation rate during inching.

12. A work vehicle, comprising:
an engine;
a travel mechanism for causing the vehicle to travel;
a transmission that includes a hydraulic clutch having a clutch plate to which is fixed a friction material and that transmits driving power from the engine to the travel mechanism;
an inching operation member for causing slipping in the hydraulic clutch; and
an inching control device, the inching control device controlling a clutch oil pressure supplied to the hydraulic clutch when the inching operation member is operated, the inching control device comprising:
an operation amount sensor arranged to detect an operation amount of the inching operation member;
a clutch oil pressure control valve arranged to adjust the clutch oil pressure;
a clutch oil pressure sensor arranged to detect the clutch oil pressure:
an oil temperature sensor for detecting a temperature of a lubricating oil supplied to the hydraulic clutch;
an inching control unit including a memory storing a coefficient of friction of the friction material, an inherent allowable heat generation rate that is determined according to a specification of the clutch plate, a heat transfer coefficient of the lubricating oil and specification values of the clutch plate, the inching control unit being programmed to acquire an allowable heat generation rate of the clutch plate;

acquire the operation amount of the inching operation member detected by the operation amount sensor;

detect a relative rotation speed that is a difference between input and output rotation speeds of the hydraulic clutch;

derive a clutch oil pressure command value corresponding to the operation amount of the inching operation member, acquire the coefficient of friction of the friction material that is stored in the memory, calculate a heat generation rate of the clutch plate during inching based on the relative rotational speed, the clutch oil pressure command value, and the coefficient of friction;

calculate a temperature of the clutch plate in a predetermined period during inching, the temperature of the clutch plate being calculated based on conditional values that include the oil temperature, the heat transfer coefficient of the lubricating oil, and the specification values of the clutch plate, calculate a correction allowable heat generation rate in accordance with the temperature of the clutch plate obtained in the predetermined period during inching, select the smaller of the inherent allowable heat generation rate and the correction allowable heat generation rate as the allowable heat generation rate, control the clutch oil pressure control valve so that the calculated heat generation rate does not exceed the allowable heat generation rate during inching, the inching control unit being further programmed to calculate a clutch oil pressure upper limit corresponding to the allowable heat generation rate, the clutch oil pressure upper limit being calculated from conditional values that include at least the allowable heat generation rate, the relative rotation speed, and the coefficient of friction, and set the clutch oil pressure to the clutch oil pressure upper limit when the calculated heat generation rate exceeds the allowable heat generation rate.

\* \* \* \* \*